United States Patent [19]

Alliston et al.

[11] Patent Number: 5,184,671
[45] Date of Patent: Feb. 9, 1993

[54] FLUIDIZED BED HEAT EXCHANGER AND METHOD OF OPERATING SAME

[75] Inventors: Michael G. Alliston, Denville; Walter R. Campbell, Jr., Union, both of N.J.

[73] Assignee: Foster Wheeler Energy Corporation, Clinton, N.J.

[21] Appl. No.: 805,732

[22] Filed: Dec. 9, 1991

Related U.S. Application Data

[60] Division of Ser. No. 414,645, Sep. 27, 1989, Pat. No. 5,108,712, which is a continuation of Ser. No. 138,814, Dec. 24, 1987, abandoned.

[51] Int. Cl.⁵ .................. F28D 13/00; F27B 15/08; F27B 15/09; F27B 15/16
[52] U.S. Cl. .................. 165/104.16; 34/57 A; 110/245; 122/4 D; 422/141; 422/142; 422/146; 431/7; 431/170
[58] Field of Search .......... 422/146, 141, 142; 34/57 A; 110/245; 122/4 D; 431/7, 170; 165/104.16

[56] References Cited

U.S. PATENT DOCUMENTS

| | | | |
|---|---|---|---|
| 2,656,258 | 10/1953 | Symonds | 422/142 |
| 4,338,283 | 7/1982 | Sakamoto et al. | 422/112 |
| 4,464,247 | 8/1984 | Thacker | 208/11 |
| 4,469,050 | 9/1984 | Korenberg | 122/4 D |
| 4,616,426 | 10/1986 | Large | 34/57 A |
| 4,694,758 | 9/1987 | Gorzegno et al. | 122/4 D |
| 4,796,691 | 1/1989 | Large et al. | 165/104.16 |
| 4,925,632 | 5/1990 | Thacker et al. | 422/142 |
| 5,108,712 | 4/1992 | Alliston et al. | 422/141 |

Primary Examiner—Robert J. Warden
Assistant Examiner—Amalia Santiago
Attorney, Agent, or Firm—Warren B. Kice; Marvin A. Naigur

[57] ABSTRACT

A fluidized bed heat exchanger and a method of controlling same in which a first chamber and plurality of additional chambers are formed in a housing. A particulate material is supported in all of the additional chambers and air is introduced to each of the additional chambers to fluidize the material. Particulate material is introduced into one of the chambers and the chambers communicate to permit the material to flow between the chambers. Heat is extracted from one or more of the other additional chambers and the material upon exceeding a predetermined height flows from the other additional chambers to the first chamber before discharging via the first chamber externally of the housing.

4 Claims, 1 Drawing Sheet

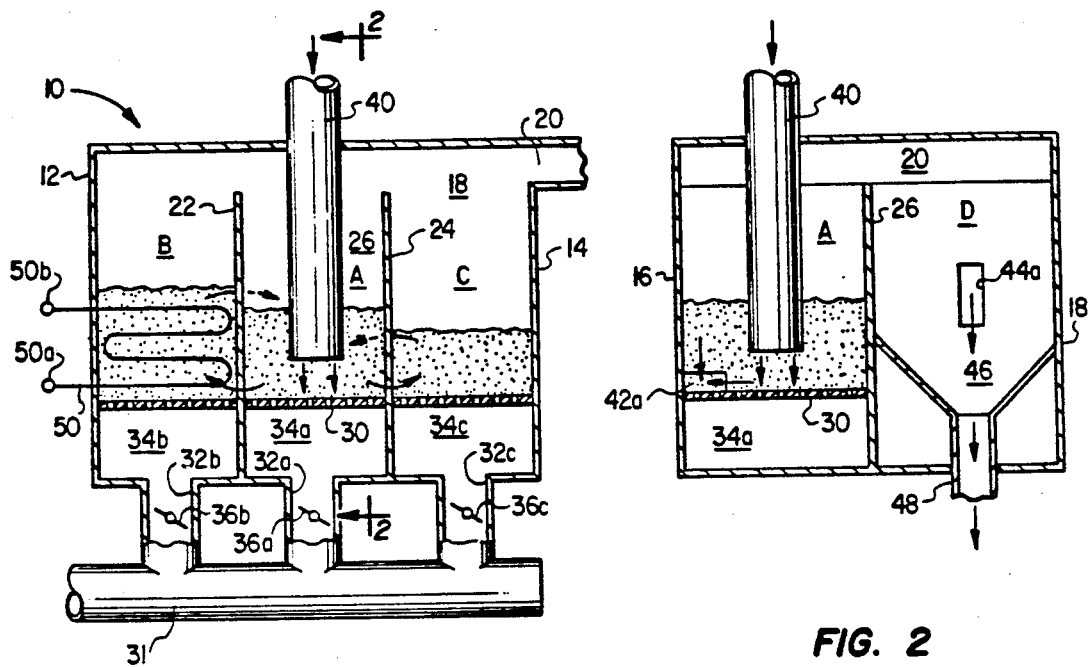
FIG. 1
FIG. 2
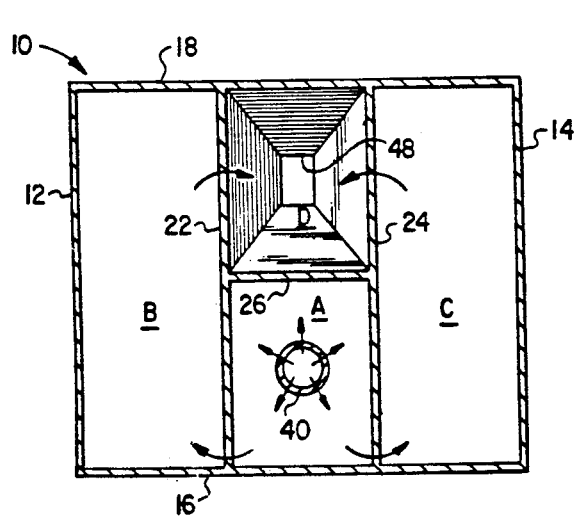
FIG. 3
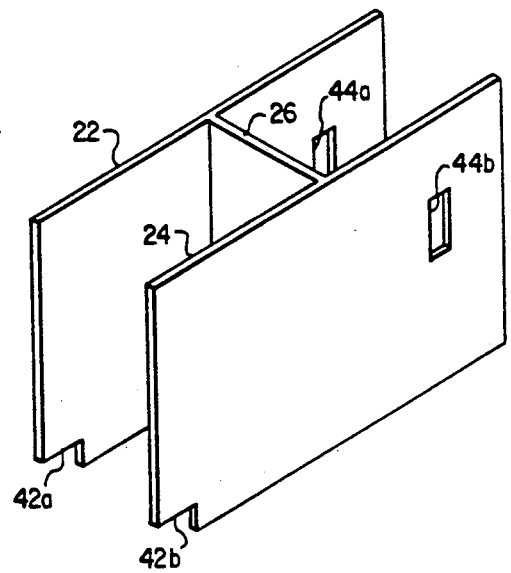
FIG. 4

FLUIDIZED BED HEAT EXCHANGER AND METHOD OF OPERATING SAME

This is a divisional of copending application Ser. No. 07/414,645, now U.S. Pat. No. 5,108,712 issued Apr. 28, 1992, filed Sep. 27, 1989, which is a continuation of Ser. No. 138,814, filed Dec. 24, 1987 (now abandoned).

BACKGROUND OF THE INVENTION

This invention relates to a fluidized bed heat exchanger and a method of operating same in which heat is transferred from hot particulate material which flows through a plurality of chambers.

Various types of reactors, or heat exchangers, such as steam generators, or the like, utilize a fluidized bed as the primary medium of heat transfer. In these arrangements, air is passed through a bed of particulate material to fluidize the bed.

The most typical fluidized bed system is commonly referred to as a "bubbling" fluidized bed in which a bed of particulate materials is supported by an air distribution plate, to which air is introduced through a plurality of openings in the plate, causing the material to expand and to take on a suspended, or fluidized, state. The gas velocity is typically two to three times that needed to develop a pressure drop at which will support the bed weight (e.g., minimum fluidization velocity), causing the formation of bubbles that rise up through the bed and give it the appearance of a boiling liquid. The bed exhibits a well-defined upper surface, and the entrainment of particles in the gas leaving the bed is quite low, such that collection and recycle of these particles is not always necessary. The heat and mass transfer properties of the two-phase mixture are high, being typical of a liquid.

In these type arrangements, heat exchange surfaces are often immersed in the bed of fluidized particulate material to remove heat from the material and utilize the heat for other purposes. When such an immersed heat exchanger is used, it is often desirable to be able to control the rate at which the heat is extracted. This is usually done by varying the fluidized bed height and therefore the quantity of surface that is immersed.

However, situations exist in which a sufficient degree of freedom in choosing bed height is not available, such as for example, when a minimum fluidized bed solids depth or pressure is required for reasons unrelated to heat transfer. In this case, the heat transfer may be controlled by diverting a portion of the particulate material so it does not contact and become cooled by the heat exchanger. When the correct portions of cooled and uncooled material are subsequently recombined, the desired final material temperature may be obtained. For example, different type valves, such as "plug valves" and "L valves," have been used to bleed a portion of the solids passing through the bed and/or to directly control the flow rates from both a heat exchanger bed and a material-pressure control bed. However, these type arrangements require the use of moving parts within the solids system and/or need solids flow conduits with associated aeration equipment.

SUMMARY OF THE INVENTION

It is therefore an object of the present invention to provide a fluidized bed heat exchanger and method of operating same in which the amount of heat extracted from the fluidized bed is controlled without having to vary the quantity of heat exchange surface that is immersed in the fluidized bed.

It is a further object of the present invention to provide a heat exchanger and method of the above type in which the heat extraction rate is controlled by diverting a portion or all of the materials from the heat exchanger without the problems normally associated therewith.

It is a still further object of the present invention to provide a heat exchanger and method of the above type in which the rate of heat extracted from the fluidized bed is controlled by bypassing a portion or all of the particulate material away from the heat exchanger and subsequently recombining it with the portion in contact with the heat exchanger.

It is a still further object of the present invention to provide a heat exchanger and method of the above type in which a plurality of separate fluidized beds are provided within the heat exchanger vessel, one or more of which is provided with heat exchange surface and the others of which are used to control the quantity of the particulate material exposed to the heat exchange surface.

Toward the fulfillment of these and other objects, a first chamber (the solids discharge chamber) and a plurality of additional chambers are provided in a housing and particulate material is introduced to one of the additional chambers and permitted to flow to the other additional chambers. Heat exchange surface is provided in one or more of the additional chambers for extracting heat from the fluidized bed therein, and the material in the additional chambers are permitted to flow into the first chamber when the level in the additional chambers exceeds a predetermined height. Material entering the first chamber is discharged from the housing to external equipment.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein:

FIG. 1 is a sectional view of the fluidized bed reactor of the present invention;

FIG. 2 is a cross-sectional view taken along the line 2—2 of FIG. 1;

FIG. 3 is a top plan view of the reactor of FIG. 1; and

FIG. 4 is an enlarged, partial, perspective view depicting the partitions utilized in the reactor of FIG. 1.

DESCRIPTION OF THE PREFERRED EMBODIMENT

Referring to FIGS. 1-4 of the drawings, the reference numeral 10 refers in general to the reactor of the present invention which includes a vessel, or housing, formed by a front wall 12, a rear wall 14, and two side walls 16 and 18 (FIG. 2). An outlet opening 20 is provided in the upper portion of the wall 14 for permitting gases to pass from the reactor, as will be explained.

A pair of spaced, parallel partitions 22 and 24 extend between the side walls 16 and 18, and a partition 26 (FIGS. 2 and 3) extends between the partitions 22 and 24 to divide the housing into four chambers, A, B, C, and D. Chamber D extends immediately behind chambers A, and chambers B and C extend to the sides of chambers A and D as better shown in FIG. 3.

An air distributor 30 extends horizontally in the lower portion of the housing between the walls 12 to 22, 24 to 14, and from the sidewall 16 to the partition 26.

An air conduit 31 is disposed below the lower end of the housing and communicates with three ducts 32a, 32b and 32c which distribute air into three plenums 34a, 34b and 34c disposed immediately below the air distributor 30 below the chambers A, B and C, respectively.

Control valves 36a, 36b and 36c are disposed in the conduits 32a, 32b and 32c, respectively, to control the flow of air from the conduit 30 into the air plenums 34a, 34b and 34c and therefore into the chambers A, B, and C, respectively.

A hot particulate material inlet pipe 40 extends from an external source (not shown) into and through chamber A, with its outlet end portion extending just above the air distributor 30. Particulate material can thus be continuously fed into chamber A via the conduit 40. It is understood that an additional particulate material can be introduced to the chamber A in a similar manner via the conduit 40 or, alternately, via another feeder (not shown).

As better shown in FIG. 4, the lower portions of those portions of the partitions 22 and 24 defining the chamber A have openings, or notches 42a and 42b, respectively, formed therethrough to permit the hot particulate material to flow from the chamber A into the chambers B and C.

A pair of weir-type openings 44a and 44b are provided in those portions of the partitions 22 and 24 which define the chamber D to permit the particulate material in the chambers B and C to overflow into the chamber D when the buildup of particulate materials in chambers B and C exceeds a predetermined height. A hopper portion 46 is provided in the lower portion of the chamber D which communicates with an outlet conduit 48 for permitting the hot particulate fuel material in the chamber D to exit from the reactor.

A heat exchanger, shown in general by the reference numeral 50, is disposed in the chamber B and consists of one or more tube bundles, one tube of which is shown by the reference numeral 50. Each heat exchanger bundle 50 has an inlet 50a connected to a source of cooling fluid, such as water or steam, and an outlet 50b for passing the fluid to external equipment after the fluid has passed through the chamber B and thus extracted heat from the fluidized bed in the latter chamber.

In operation, hot particulate material is introduced into the chamber A via the inlet conduit 40, it being understood that additional material can also be introduced into the chamber in a similar manner. The air dampers 36a, 36b and 36c are opened as desired to permit fluidizing air to pass upwardly through the air plenums 34a, 34b and 34c and through the air distributor 30 and into the chambers A, B and C, respectively. The air thus fluidizes the particulate material in the chambers A, B and C, with the velocity of the air and therefore the degree of fluidization and the resultant height of the material in the chambers being controlled as needed by varying the position of the dampers 36a, 36b and 36c. The particulate material accumulating in the chamber A passes through the openings 42a and 42b in the partitions 22 and 24 respectively, and into the chambers B and C, respectively.

The fluidizing air for chambers A, B, and C passes to the upper portions of the chambers A, B, and C where it exits through the outlet 20. The particulate material builds up in chambers A, B and C and, when the height of the material exceeds the height of the weir openings 44a and 44b, the material will overflow into the chamber D and exit via the outlet 48.

The velocity of the air entering the chamber A is controlled by the damper 36a to fluidize the particulate material in the bed at a value that is considered to be optimum for providing a pressure seal for the conduit 40. The air velocity entering the beds in the chambers B and C is controlled by the dampers 36b and 36c according to heat transfer control requirements. Since the fluidizing velocity in the chambers B and C will usually be different from that in chamber A, the material in the chambers B and C will have different densities. Since the particulates material communicates between the chambers A and B and between the chambers A and C through the openings 42a and 42b, the beds will operate at different heights. The exit weirs 44a and 44b will therefore discharge quantities of material from the chambers B and C, respectively, into the chamber D that depend upon the expanded bed heights attained in chambers B and C. In this manner, the fraction of the total material flow that passes through the chambers B and C is controlled by varying the fluidized velocities in the latter beds.

It is thus seen that several advantages result from the foregoing. For example, the heat extraction rate from the fluidized bed in the chamber B is controlled by varying the air velocity in the chambers B and C. Also, the reactor of the present invention can be easily started up since there is an uncooled flow path for the particulate material during startup. Also, the solids exit from the reactor of the present invention via the conduit 48 while avoiding backflow or backsplashing. Further, a sufficient height of particulate material in the chamber A is assured to provide a pressure seal for the inlet conduit 40. Also, the mass of material contained in the beds provides a buffer against flow transients and/or pressure transients.

A latitude of modification, change and substitution is intended in the foregoing disclosure and in some instance some features of the invention will be employed without a corresponding use of other features. Accordingly, it is appropriate that the appended claims be construed broadly and in a manner consistent with the scope of the invention.

What is claimed is:

1. A method for operating a fluidized bed heat exchanger comprising the steps of providing a fluidized bed heat exchanger having an inlet chamber, an outlet chamber and two additional chambers, introducing particulate material through said inlet chamber; permitting said material to flow simultaneously from said inlet chamber to both of said two additional chambers; removing heat from said material in at least one of said two additional chambers; permitting said material to flow from said two additional chambers to said outlet chamber; introducing air to at least one of said inlet and two additional chambers to fluidize the material therein; and discharging said material from said outlet chamber.

2. A method of claim 1 wherein said material flows simultaneously from said two additional chambers to said outlet chamber.

3. The method of claim 1 wherein said air is introduced into said inlet chamber and said two additional chambers to fluidize the particulate material therein.

4. The method of claim 1 wherein said material flows from said two additional chamber to said outlet chamber in response to the height of said material in said two additional chambers exceeding a predetermined value.

* * * * *